United States Patent
Matsushima et al.

(10) Patent No.: US 7,872,865 B2
(45) Date of Patent: Jan. 18, 2011

(54) DISK ARRAY DEVICE AND ELECTRONIC DEVICE

(75) Inventors: Hitoshi Matsushima, Ryugasaki (JP); Hiroshi Fukuda, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/372,753

(22) Filed: Feb. 18, 2009

(65) Prior Publication Data

US 2009/0268391 A1    Oct. 29, 2009

(30) Foreign Application Priority Data

Apr. 28, 2008    (JP)    ............... 2008-116557

(51) Int. Cl.
    H05K 7/20    (2006.01)
(52) U.S. Cl. .............. 361/695; 361/687; 361/690; 165/104.33; 454/184
(58) Field of Classification Search ............ None
    See application file for complete search history.

(56) References Cited

U.S. PATENT DOCUMENTS

| | | | | |
|---|---|---|---|---|
| 5,414,591 | A * | 5/1995 | Kimura et al. | 361/695 |
| 5,673,029 | A * | 9/1997 | Behl et al. | 340/635 |
| 5,782,546 | A * | 7/1998 | Iwatare | 312/236 |
| 6,579,168 | B1 * | 6/2003 | Webster et al. | 454/184 |
| 6,819,563 | B1 * | 11/2004 | Chu et al. | 361/696 |
| 6,932,443 | B1 * | 8/2005 | Kaplan et al. | 312/213 |
| 7,010,930 | B2 * | 3/2006 | Arik et al. | 62/259.2 |
| 7,031,154 | B2 * | 4/2006 | Bash et al. | 361/690 |
| 7,182,208 | B2 * | 2/2007 | Tachibana | 211/26 |
| 7,499,273 | B2 * | 3/2009 | Casebolt | 361/679.48 |
| 7,525,799 | B2 * | 4/2009 | Lai et al. | 361/695 |

FOREIGN PATENT DOCUMENTS

| | | |
|---|---|---|
| JP | 5-133173 | 5/1993 |
| JP | 6-29681 | 2/1994 |
| JP | 11-204974 | 7/1999 |
| JP | 2000-049482 | 2/2000 |
| JP | 2002-223091 | 8/2002 |
| JP | 2006-20800 | 8/2006 |
| JP | 2007-505285 | 3/2007 |
| JP | 2008-016137 | 1/2008 |
| JP | 2008-191996 | 8/2008 |

OTHER PUBLICATIONS

Office Action issued in Japanese Patent Application No. 2008-116557 on Jun. 22, 2010.

* cited by examiner

*Primary Examiner*—Boris L Chervinsky
(74) *Attorney, Agent, or Firm*—Antonelli, Terry, Stout & Kraus, LLP.

(57) ABSTRACT

Provided is a disk array device or an electronic device having an enhanced cooling performance with lower noises. The disk array device has doors in the front side and in the rear side of the device, each of the doors is formed with outside openings which are louver-like or bend-like, the louver- or bend-like openings in the doors being directed in directions which are opposite to each other between the door on the suction side and the door on the exhaust side.

11 Claims, 9 Drawing Sheets

DISK ARRAY DEVICE AND ELECTRONIC DEVICE

INCORPORATION BY REFERENCE

The present application claims priority from Japanese application JP2008-116557 filed on Apr. 28, 2008, the content of which is hereby incorporated by reference into this application.

BACKGROUND OF THE INVENTION

The present invention relates to a disk array device in which a plurality of disk drives are mounted, and an electronic device having a heating element such as a CPU.

A disk array device has several magnetic or optical disk drives which are mounted in a housing in order to enhance the reliability of data storage. These disk array devices are connected to a high speed dedicated network line which is optical or the like, and are operated under a management software. In this operation, these devices are used in an SAN (storage area network), an NAS (network attached storage) or a single RAID (Redundant Array of Inexpensive Disks). A disk drive mounted in each of these disk array devices has a drive motor, an actuator and electronic control components including an LSI, which are main heat sources therein. The heat sources are cooled by cooling air fed from a cooling fan incorporated in the housing of the disk array device.

In the case of having a low cooling capacity, the temperature of the disk drive increases, and as a result, there would be possibly caused a risk of erroneous operation and lowering of the long period reliability. Further, a controller managing the transmission of data between external control equipments and disk drives generates a highly capacitive heat. Thus, in the case of such a low cooling capacity, the temperatures of the controller and the like are increased, resulting in erroneous operation and damages to electronic components.

Further, there would be an important task for reducing noises produced from a fan for driving an air flow within the disk array device since no sufficient air volume for the cooling would not be ensured due to a noise problem. Thus, the disk array devices inherently have raised both tasks of satisfactorily cooling electronic components such as a CPU which generate a heat and lowering noises in the device. Electronic devices having a heat source such as a CPU, have also raised similar tasks.

In the most of conventional disk array devices and electronic devices, a fan is incorporated within a housing in order to lower noises. In this case, the fan possibly transmits vibration to a disk drive in view of its structure. Should the peak vibration frequency of the fan be coincident with a natural frequency of the disk drive, there would be caused a risk of impeding the reading and writing of the disk drive.

The disk array device and the electronic device are usually used with their doors being closed. However, the doors would be opened during service and maintenance thereof, such as replacement of disk drives. In order to carry out the maintenance for the disk arrays device or the electronic device without stopping the operation thereof, it is important to maintain the cooling capacity for components accommodated in a housing and being apt to be heat source even in such a case.

Abrupt increase in power consumption has become critical problems to be solved under the management of a data center due to spread using of blade servers and increasing of a scale of storages. For example, the heating value of a server has been increased by 20 to 25% on an annual base, and it is prospected that the power of about 20 kW per unit will be consumed after a lapse of several years. That is, it is considered that the ratio between power consumption by a server and power consumption for cooling the server will be increased from 1:1 to 1:1.5 to 2.0. Accordingly, the power consumption required for the cooling has become a critical problem.

In the case of arranging several disk array devices and electronic devices in one and the same space as in the conventional data center or the like, there has been generally used an air-conditioner with the configuration that cooling air is fed from a portion underneath the floor of a building and heated air is exhausted from the ceiling of the building. In the case of mounting disk array devices and electronic devices in a densely packed condition, there would be cased the problem that heated air around the ceiling is likely to be again reintroduced in the disk array devices, mainly causing an increase in the costs of air condition, and a limitation to the number of equipments to be mounted.

As a conventional data center, JP-A-2006-208000 discloses a system for monitoring an air stream so as to enhance the cooling efficiency, and controlling the cooling in the data center in dependence upon a detected air stream. Further, JP-A-2007-505285 discloses a system for determining an index value of recirculation of air stream.

In conventional electronic equipment, louvers are formed in an equipment housing in order to uniformly cooling the equipment in the housing as disclosed in JP-A-2000-49482 and JP-A-11-204974.

The conventional technology as disclosed in JP-A-2006-208000 and JP-A-2007-505285 requires sensors provided in several parts in the data center and a controller for determining a situation, and accordingly, has a complicated configuration. Further, no process for enhancing the cooling efficiency of the device itself is disclosed.

The technology as disclosed by JP-A-2000-49482 and JP-A-11-204974, focuses only to pneumatic control in the housing, that is, it does not concern control of intake and exhaust air.

Further, JP-A-2006-208000, JP-A-2007-505285, JP-A-2000-49482 and JP-A-11-204974 do never disclose the technology of lowering noises generated from the disk array device and an electronic device.

BRIEF SUMMARY OF THE INVENTION

An object of the invention is to provide a disk array device which can materialize the enhancement of the capacity thereof and the increase of the speed of an electronic device.

To the end, according to the invention, there is provided a disk array device incorporating several disk drives or an electronic device incorporating components including a CPU, and being apt to be heat sources, comprising doors provided in the front and rear sides of the device, louvers or bends provided in an outside opening part of each of the doors, the directions of the louvers and bends are reverse to each other between the intake side door and the exhaust side door.

Further, the above-mentioned object can be achieved by the hollow doors provided on the front and rear sides of the device, each of which has inside openings and outside openings, and a plurality of fans attached to at least either one of the doors, and the outside openings of each of the doors are louver- or bend-like.

The above-mentioned object can be achieved by the louvers- or bend-like openings which are directed downward on the suction side but which are directed upward on the exhaust side.

Further, the above-mentioned object can be achieved by the louver- or bend-like openings which are directed horizontally.

Further, the above-mentioned object can be achieved by the louver-like and bend-like openings which are directed in an identical direction for every row of housings which are arranged in a plurality of rows in a space of a building such as a data center, but are different between each adjacent rows.

Further, the above-mentioned object can be achieved by the outside openings of the door which are louver-like or bend-like, and the inside openings of the door having the same size as that of the fans.

Further, the above-mentioned object can be achieved by sound absorbing members applied on an inner surface of a hollow door located on each of the front and rear side of the device, or each of inner and outer surfaces thereof.

Further, the above-mentioned object can be achieved by an active noise control device incorporated in a hollow door located on each of the front and rear sides of the device.

Further, the above-mentioned object can be achieved by the louver- or bend-like openings which are formed so that the inner surface of the hollow inside part of the door is invisible as viewed in front thereof.

According to the invention, there can be provided a disk array device and an electronic device having a large capacity and a high speed performance.

Other objects, features and advantages of the invention will become apparent from the following description of embodiments of the invention taken in conjunction with the accompanying drawings.

DETAILED DESCRIPTION OF THE INVENTION

Explanation will be made of embodiments of the present invention with reference to the accompanying drawing.

Embodiment 1

Figure 1:
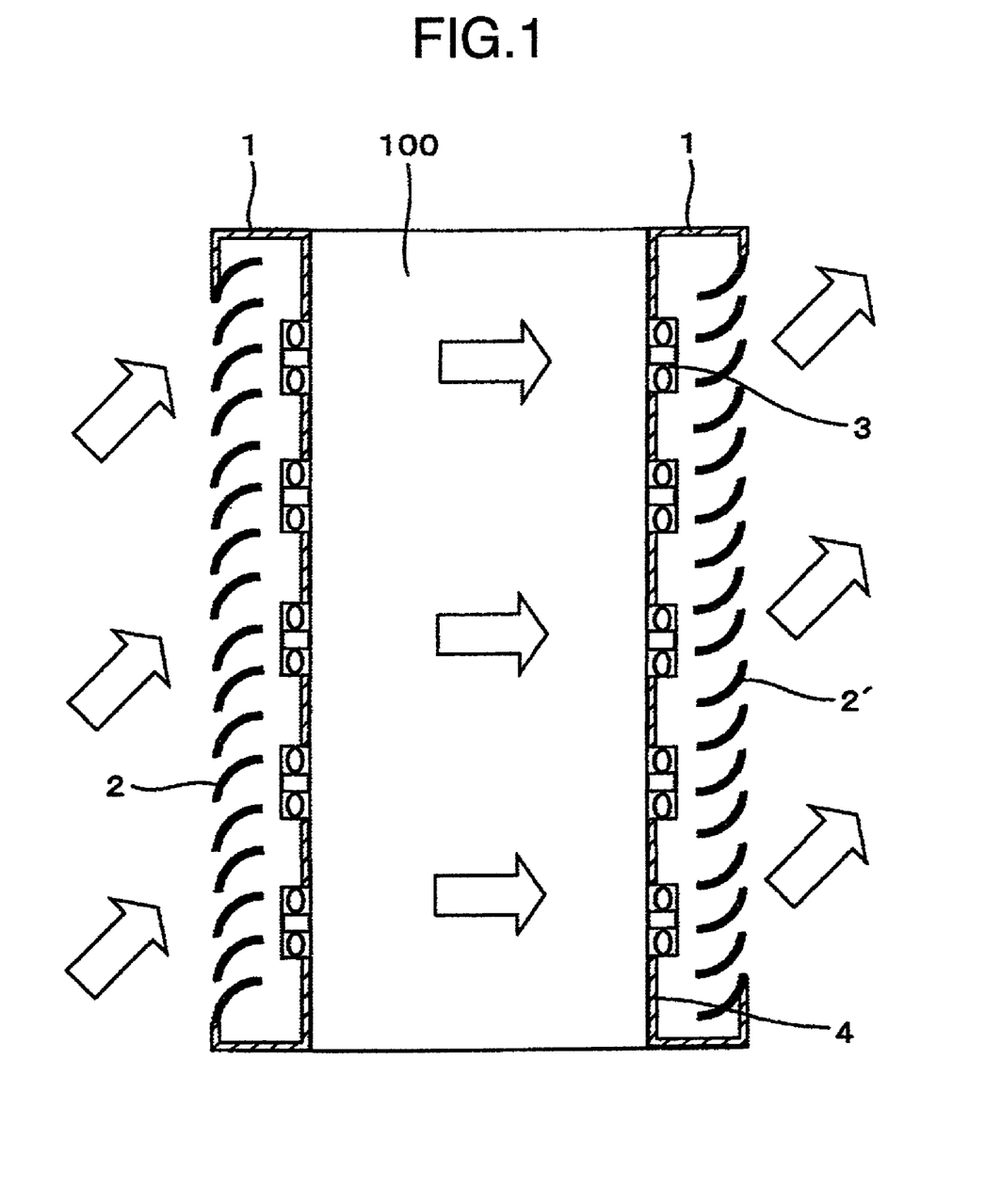
FIG. 1 is a sectional view illustrating a disk array device in a first embodiment of the invention.
Figure 2:
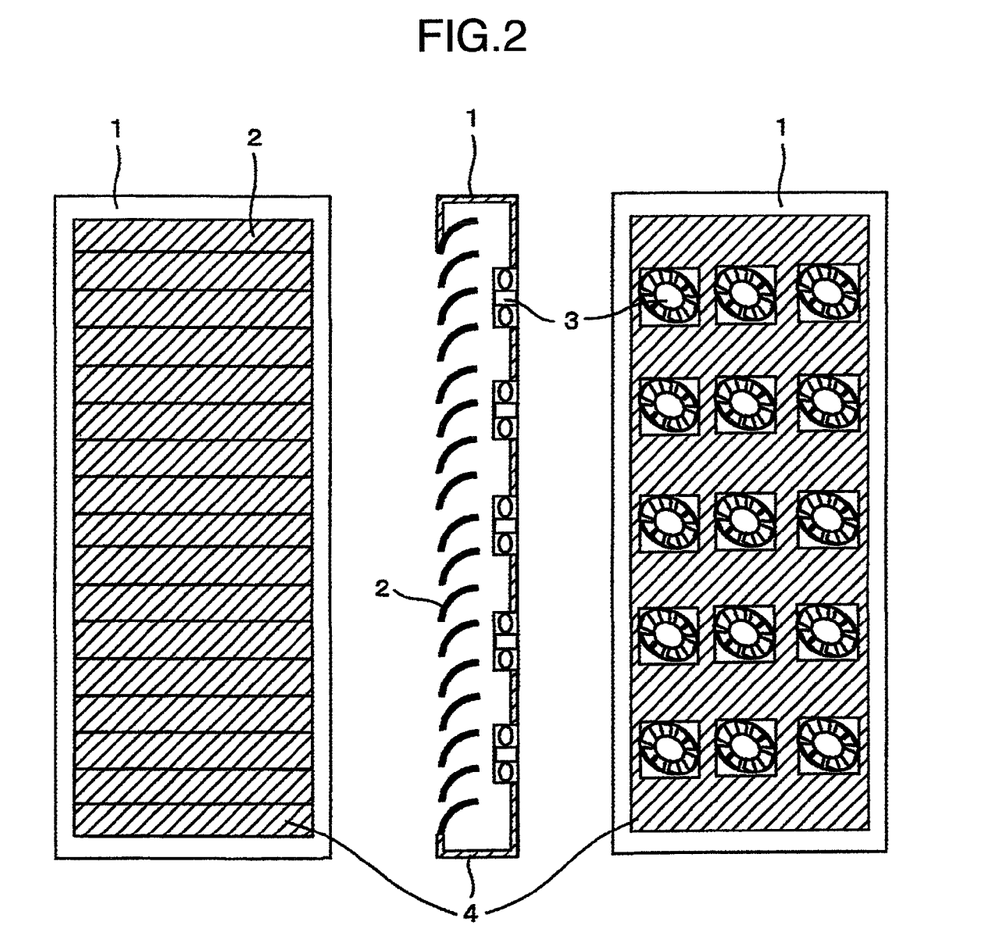
FIG. 2 shows views illustrating a structure of a door in the first embodiment of the invention.
Figure 3:
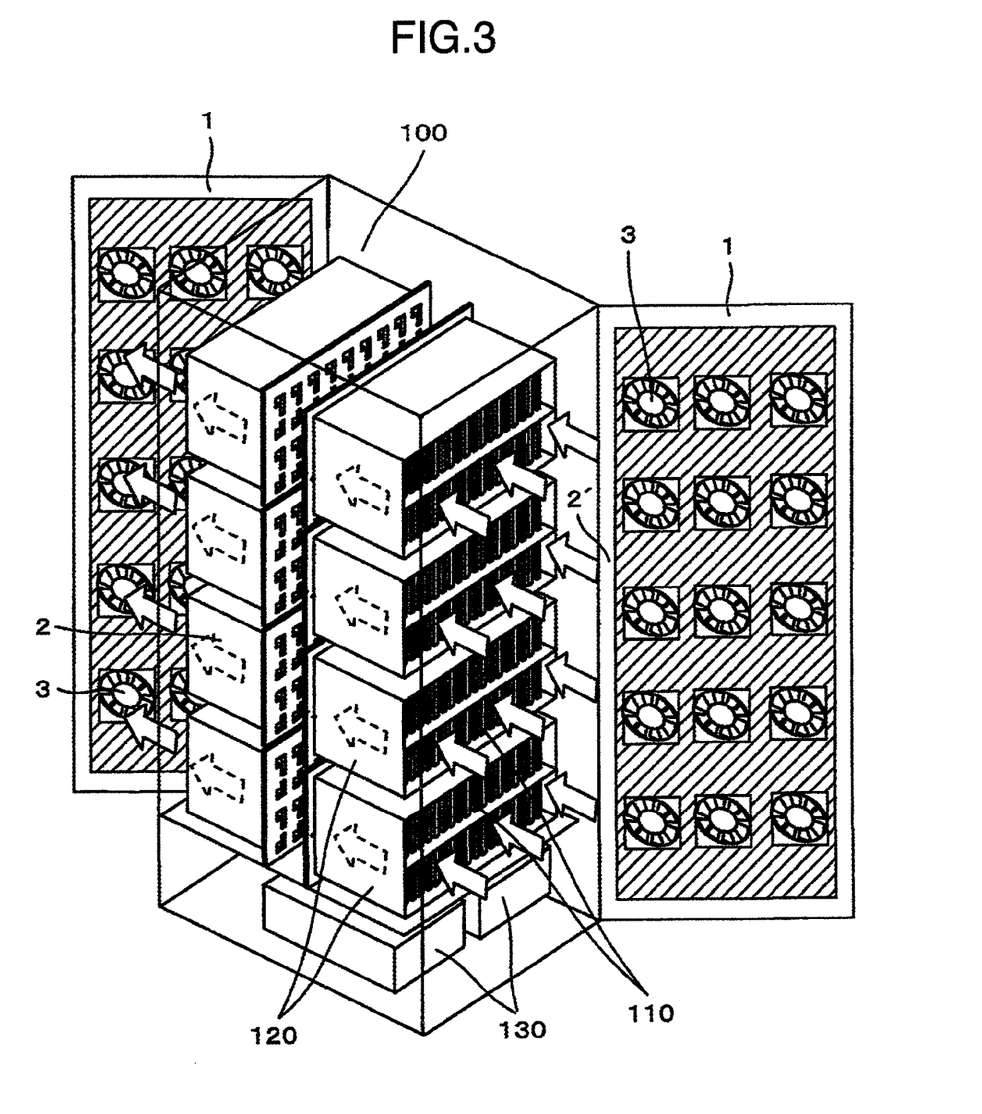
FIG. 3 is a bird view illustrating the disk array device in the first embodiment of the invention.

FIGS. 1 to 3 show the first embodiment of the present invention, in which FIG. 1 is a cross-sectional view which shows a disk array device in the first embodiment of the invention, FIG. 2 is views which shows a structure of a door 1 in this embodiment, and FIG. 3 is a bird view which shows the disk array device in this embodiment.

Referring to FIGS. 1 to 3, the disk array device in this embodiment of the invention has a housing 100 which incorporates, in its upper part, a disk box 120 mounted therein several disk drives 100, and which is also mounted in its lower part with power sources 130 and other circuit boards such as a controller. Further, an openable door 1 in which several fans 3 are mounted is provided in each of the front and rear parts of the housing 100.

The door 1 in this embodiment is hollow as shown in FIG. 2, and is applied over the inner and outer surfaces thereof with sound absorbing members 4. The door 1 is incorporated in the front side thereof with several louvers 2, and in the rear side thereof with several fans 3. The louvers 2 provided in the front side of the door 1 are configured so that the inner surface of the hollow space is invisible as viewed in front thereof. Further, the louvers 2 are also applied thereover with the sound absorbing members 4 on opposite sides thereof. There is arranged the configuration that the direction of the louvers 2 is downward on the front suction side of the door 1, but is upward on the rear exhaust side of the door 1. Further, openings formed in the rear side of the door 1 have a size the same as that of the fans 3. No openings other than those for the fans 3 are present.

It is noted that the fans 3 and the disk drives 110 seem to be main noise sources. Sounds generated from fans 3 are propagated in opposite directions respectively toward the hollow door 1 and the housing 100. Further, sounds generated from the disk drives 110 are propagated in a direction outward of the housing 100, that is, in a direction toward the hollow door 1.

In this embodiment, of noises generated from the fans 3, those which are directed toward the hollow door 1 are blocked by the louvers 2, and accordingly, are reflected, and therefore, those noises are prevented from directly exiting, that is, they are subjected to repetitions of reflection in the hollow space in the door 1, and then, they finally exit. During the reflections upon the inner surfaces, the noises generated from the fans 3 are reduced, by a large degree, by the sound absorbing members 4 applied over the inside part of the hollow door 1.

Meanwhile, of noises generated from the fans 3, those which are directed toward the housing 100, are repeatedly reflected within the housing 100 between the doors 1 on the opposite side, and accordingly, are reduced, being absorbed in its energy by the sound absorbing members 4 applied over the outside part of the door 1. Similarly, noises generated from the disk drives 110 are repeatedly reflected between the doors 1 on the opposite sides within the housing 100, and are reduced by the sound absorbing member 4 applied over the outside parts of the doors.

It is noted that even with the sound absorbing member 4 applied only over the inner surface of the hollow door, a substantial sound absorbing effect can be also obtained.

In general, the sound absorbing members 4 have a material property capable of effectively attenuating high frequency components not less than 500 Hz. An axial flow type fan 3 which is usually used for cooling a disk array device and an electronic device generates noises having prominent peak values in a range from 500 to 1,000 Hz, and accordingly, the sound absorbing property of the sound absorbing member 4 can be effectively used.

Further, with this configuration, the cooling air blown from the fans 3 in the doors 1, that is, the cooling air flow into the housing 100 from the door 1 on the front side of the housing 100 so as to cool the disk drives 110, the power sources 130, circuit boards and the like within the housing 100, and is then exhausted from the door 1 on the rear side of the housing.

In the case of a conventional data center or the like in which the several disk array devices and electronic devices are arranged in one and the same space, there has been used in general an air conditioner having the configuration that cooling air is fed from a part underneath the floor, and the heated air is exhausted from the ceiling. In the case that the disk array devices and the electronic devices are mounted in a highly dense manner, there would be raised the problem that the heated air in the vicinity of the ceiling is likely to be reabsorbed in the disk array devices or the electronic devices, resulting in increase in the air-conditioning costs, and limitation to the number of installed equipments.

In this embodiment in which the louvers 2 are directed downward in the door 1 on the front suction side while the louvers 2 are directed upward in the door 1 on the rear exhaust side, the cooling air is readily sucked into the housing 100 from the lower surface side of the floor while the exhausted air can be smoothly led toward the ceiling side. Thus, the possibility of occurrence of the case that the heated air in the vicinity of the ceiling is sucked again into the disk array devices or the electronic devices can be greatly reduced.

It is noted that a conventional disk array device has been in general mounted within the housing 100 in view of lowering of noises. In this case, vibration is possibly transmitted from the fans to the disk drives 100, although being dependent upon a structure thereof. In the worst case, should the peak frequency of the vibration be coincident with the natural frequency of the disk drives 110, the writing and reading of the disk drives 110 would been hindered. According to this embodiment, the fans 3 are assembled within the doors 1 so that the vibrations are prevented from being transmitted, direct to the disk drives 110, and accordingly, the possibility of occurrence of the above-mentioned problem can be eliminated, thereby it is possible to always satisfy the recording and writing of the disk drives.

The openable doors 1 in this embodiment are normally used, being closed, but they are sometimes opened during the service and maintenance thereof, such as replacement of the disk drives 110 or the like. In this embodiment in which the doors 1 incorporating several fans 3 are arranged in the front and rear sides of the housing 100, the speeds of the fans 3 in one of the doors 1 can be increased to a value which is higher than a normal speed thereof even though the other one of them is opened, and accordingly, the cooling for heated components in the housing can be maintained. Specifically, in this embodiment, the temperature of exhausted air is monitored by a sensor which is not shown, on the most downstream side of the housing 100, thereby it is possible to control the speeds of the fans 3 in accordance with the temperature detected by the sensor.

When one of the doors 1 is opened, the volume of the cooling air is decreased, and accordingly, the temperature of exhaust gas is increased. The above-mentioned sensor senses this increased temperature and delivers a signal for increasing the speed of the fans 3 in order to prevent the volume of the cooling air from being lowered. Thus, the service and maintenance of the disk drive array device can be carried out without stopping the operation of the housing 100. This matter is very important for the disk array device and the electronic device adapted to be used for high ends which require a high degree of reliability.

In this embodiment, sounds from the fans 3 which are main noise sources in the disk array device and from the disk drives 110 can be efficiently prevented from leaking outside from the device, thereby it is possible to aim at suppressing noise in the device. Further, the possibility of reintroduction of heated air into the disk array device from a space in the vicinity of the ceiling can be greatly reduced, thereby it is possible to enhance the cooling efficiency.

Embodiment 2

Figure 4:
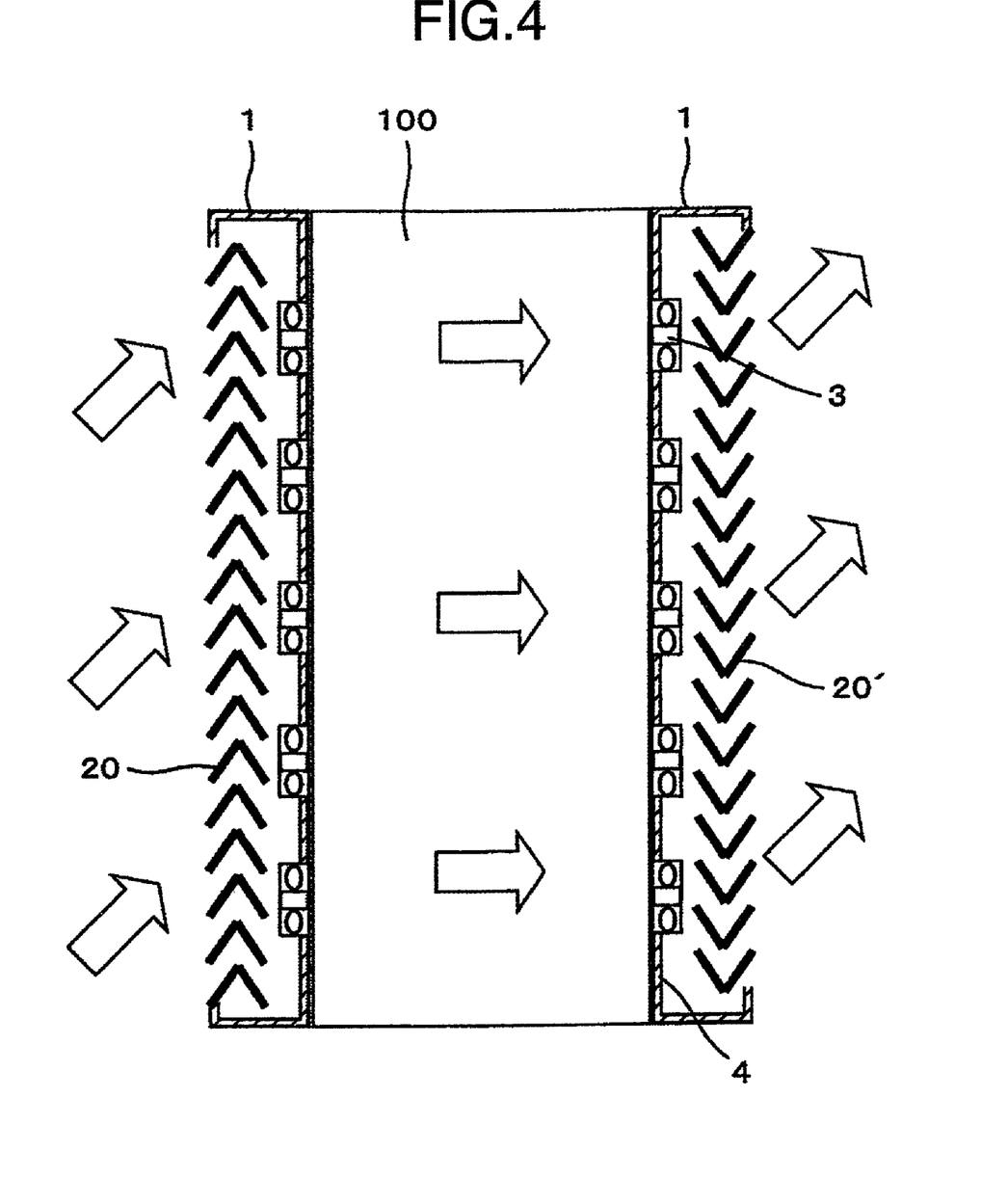
FIG. 4 is a cross-sectional view illustrating a disk array device in a second embodiment of the invention.
Figure 5:
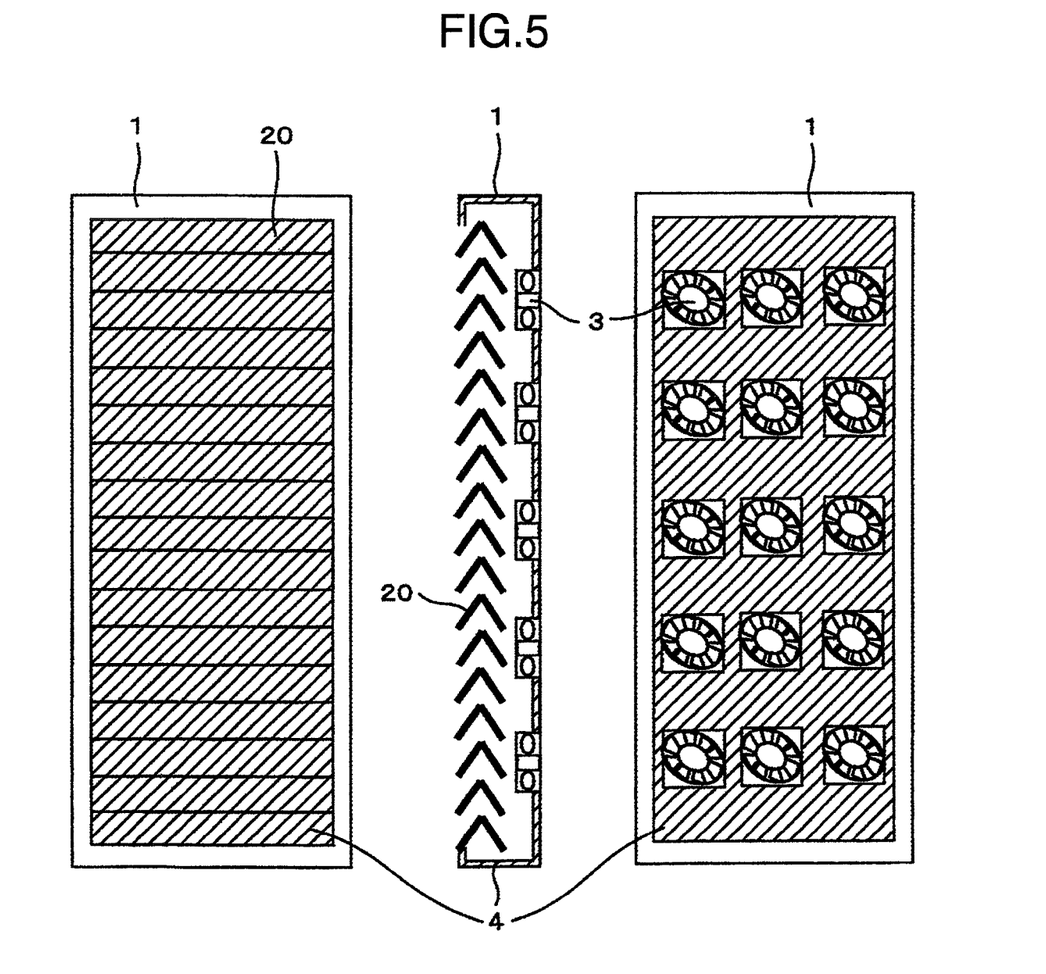
FIG. 5 shows views illustrating the structure of a door in the second embodiment of the invention.

The second embodiment of the invention is shown in FIGS. 4 and 5.

FIG. 4 is the cross sectional view which shows a disk array device in this embodiment.

FIG. 5 is the showing the structure of a door 1 in this embodiment.

Referring to FIGS. 4 and 5, the door 1 is hollow even in this embodiment, having the inner surface and the outer surface which are applied thereover with sound absorbing members 4. Several bends 20 are formed in the front side of the door 1, and several fans 30 are mounted in the rear side thereof. The bends 20 are formed in the front side of the door so that the inner surface of the hollow space in the door 1 is completely invisible as viewed in from thereof, and they are also applied on opposite side surfaces thereof with the sound absorbing members 4. The bents 20 are configured so as to be directed downward in the door 1 in the forward suction side, but be directed upward in the door 1 in the rearward exhaust side. Further, openings in the rear side of the door 1 have a size the same as that of the fans 3. No openings other than those for the fans 3 are present.

Even in this embodiment, of noises generated from the fans 3, those directed toward the hollow door 1 is blocked by the bends 20 and then are reflected thereupon so as to be prevented from directly going outside from the door 1, that is, after repetitions of the internal surface reflection within the hollow space in the door 1, the noises finally go outside from the door 1. After the repetitions of the inner surface reflection, the noises from the fans 3 can be greatly suppressed, being reduced by the sound absorbing members 4 applied over the inner surface of the door 1.

Meanwhile, of noses generated from the fans 3, those directed toward the housing 100 are repeatedly reflected at several times within the housing 100 between the doors 1 on the opposite sides, and accordingly, the energy of the noises is absorbed by the sound absorbing members 4 applied over the outer surfaces of the doors 1 so as to reduce the sounds thereof. Similarly, the noses from the disk drives 110 are repeatedly reflected between the doors 1 on the opposite sides within the housing 100, and accordingly, their sounds are suppressed by the sound absorbing members 4 applied over the outer surfaces of the doors 1.

It is noted that a substantial noise suppressing effect can be obtained even though the sound absorbing members 4 are applied only over the inner surfaces of the hollow doors 1.

Since the bends 20 in this embodiment have large concavities and convexities, the inside of the hollow space in the door cannot be seen, as viewed not only just in front of the door but also in any angular direction in front thereof. Thus, there can be obtained an extremely sufficient noise suppression effect.

Even in this embodiment in which the bends 20 are directed upward in the door 1 on the forward suction side but are directed downward in the door on the rearward exhaust side, as stated above, the housing 100 is likely to absorb the cooling air underneath the floor. Further, the exhaust air can smoothly flow toward the ceiling. Thus, the possibility of suction of heated air into the disk array device from a space in the vicinity of the ceiling can be greatly reduced.

According to this embodiment, the fans 30 are assembled in the door 1, vibration can be prevented from being directly propagated from the fans 3 to the disk drives 110, thereby it is possible to satisfactorily carry out writing and reading in the disk drives 110.

Even in this embodiment, sounds generated from the fans 3 and the disk drives 110 which are main noise sources in the disk arrays device can be efficiently prevented from leaking outside from the device, thereby it is possible to aim at suppressing noises generated from the device. Further, it is possible to greatly reduce the possibility of reintroduction of heated air into the disk array device from a space in the vicinity of the ceiling, thereby it is possible to enhance the cooling efficiency.

Embodiment 3

Figure 6:
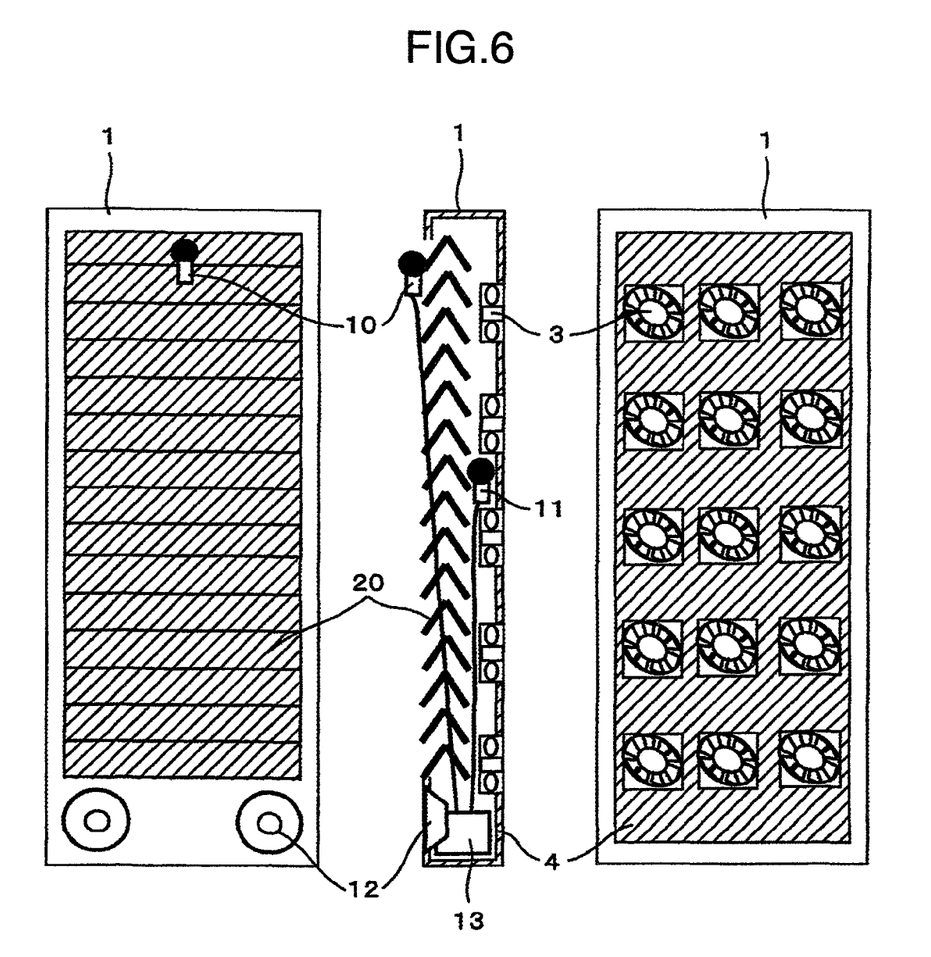
FIG. 6 shows views illustrating a structure of a door in a third embodiment of the invention.

The third embodiment of the invention is shown in FIG. 6.

FIG. 6 is the view showing the structure of the door 1 in this embodiment.

Referring to FIG. 6, the door 1 in this embodiment has also a hollow inside space, having an inner surface and an outer surface over which sound absorbing members 4 are applied. Several bends 20 are formed in the front side of the door 1, and several fans 3 are mounted in the rear side thereof. The bends 20 are formed in the front side of the door 1 in the manner that the inside surface of the hollow space is completely invisible, as viewed in front thereof, and are also applied over their opposite surfaces with the sound absorbing members 4. The bends 20 are directed downward in the forward suction side of the door 1, but are directed upward on the rear exhaust side thereof. Further, openings formed in the rearward side of the door 1 have a size equal to that of the fans 3. No openings other than those for the fans 3 are present.

In this embodiment, the hollow door 1 is incorporated therein with an ANC (active noise control) device set is incorporated in the hollow door 1. The ANC sensor in this embodiment is incorporated therein with an error sensor 10, a noise sensor 11, a speaker 12 and a digital type ANC controller 13. The ANC device digitally computes signals having phases reverse to those of noises picked up by the noise sensor 11 for respective frequency components, and issues these signals in the form of correcting sounds having the phases reverse to that of the noises from a speaker 12 in order to aim at suppressing the sounds. On this stage, the ANC controller 13 repeats the computation at every moment so as to minimize the values of noises detected by the sensor 10.

Even in this embodiment, of noises generated from the fans 3, those directed toward the hollow door 1 are blocked and reflected by the bends 20 without directly going outside from the door 1, and carries out repetitions of inner surface reflection within the follow space of the hollow door 1 before the noises go outside. Upon the inner surface reflection, the noises from the fans 3 can be greatly reduced by the sound absorbing members 4 applied over the inside surface of the door 1.

Meanwhile, of the noises generated from the fans 3, those directed toward the housing 100 are repeatedly reflected within the housing 100 between the doors 1 on the opposite sides, and the energy thereof is absorbed by the sound absorbing members 4 applied on the outside of the doors 1 in order to reduce the sounds thereof. Similarly, the noises from the disk drives are repeatedly reflected between the doors 1 on the opposite sides within the housing 100 so as to be suppressed, by a large degree, by the sound absorbing members 4 applied over the outside of the door 1.

It is noted that a substantial sound absorbing effect can be obtained even only by the sound absorbing members 4 applied over the inner surface of the door 1.

In general, the sound absorbing members 4 can effectively attenuate high frequency components, but can hardly remove low frequency components having frequencies which are not higher than, for example 500 Hz.

The ANC device is adapted to aim at suppressing noises having frequencies not higher than 500 Hz with sounds having reverse phases, and accordingly, it is possible to suppress the sounds in an extremely satisfactory manner with the use of the hollow doors 1.

Even in this embodiment, as stated above, there is provided the configuration that the bends 20 are directed downward in the door 1 on the forward suction side but are directed upward in the door 1 on the rearward exhaust side, and accordingly, cooling air underneath the floor is likely to be absorbed into the housing 100. Further, the exhaust gas smoothly flows toward the ceiling. Thus, thereby it is possible to greatly reduce the possibility of introduction of the heated air into the disk array device from a space in the vicinity of the ceiling.

Even in this embodiment, the fans 3 are assembled in the door 1, and accordingly, vibrations can be prevented from being propagated from the fans 3 to the disk drives, thereby it is possible to always satisfy the reading and writing in the disk drive devices 110.

As stated above, even in this embodiment, the sounds generated from the fans 3 and the disk drives 110 which are main noise sources in the disk drive array device can be efficiently prevented from leaking outside from the device, thereby it is possible to aim at effectively suppressing the sounds from the device. Further, it is possible to greatly reduce the possibility of reintroduction of heated air into the disk array device from a space in the vicinity of the ceiling, thereby it is possible to enhance the cooling efficiency.

Embodiment 4

Figure 7:
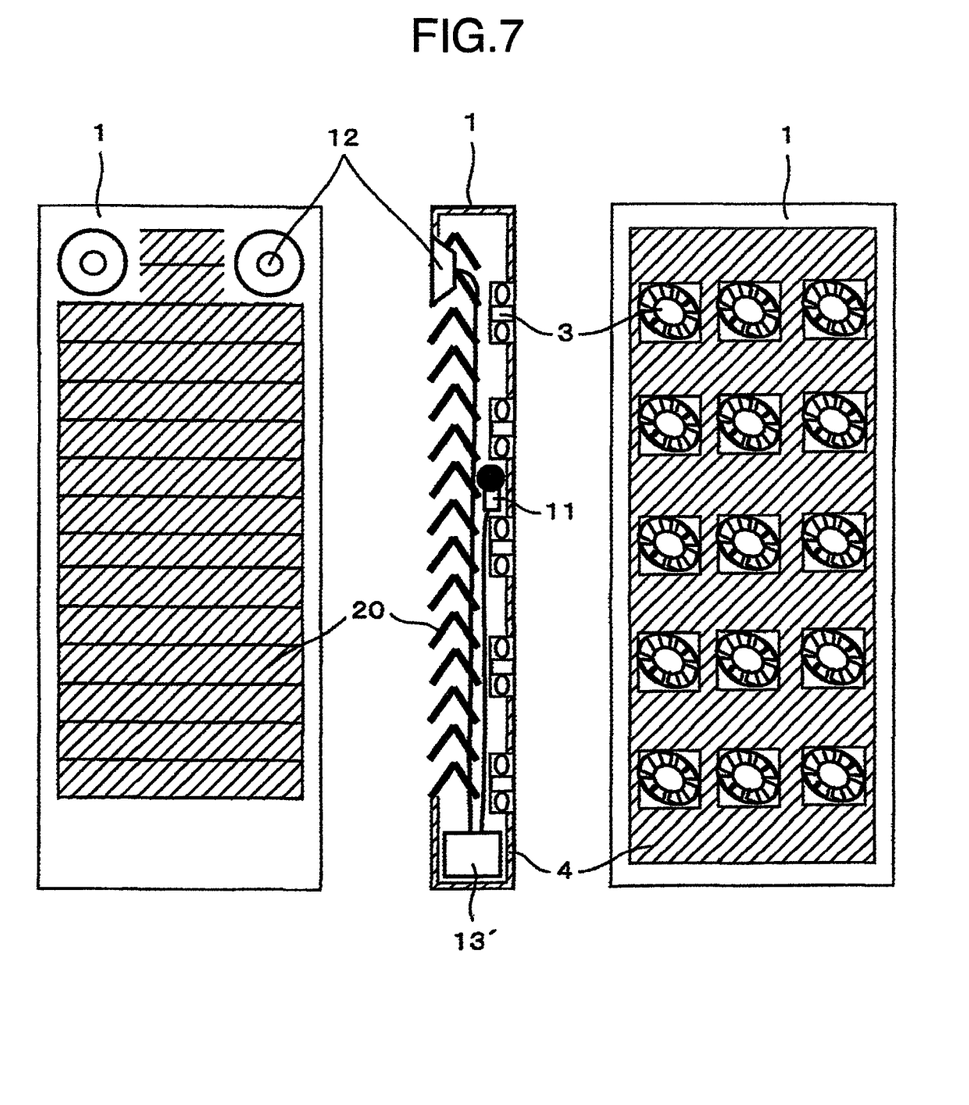
FIG. 7 shows views illustrating a structure of a fourth embodiment of the invention.

The fourth embodiment of the invention is shown in FIG. 7.

FIG. 7 is the view showing a structure of a door in this embodiment.

Referring to FIG. 7, the door 1 also has a hollow inside space, having inner and outer surfaces applied thereover with sound absorbing members 4, and are formed therein with several bends 20 in the front side thereof, and are mounted therein with several fans 3 in the rear side thereof. The bends 20 in the front side of the door are formed so that the inner surfaced of the hollow inside space is completely invisible as viewed in front thereof, and are also applied with sound absorbing members 4 over their opposite side surfaces. The bends 20 are directed downward in the door 1 on the forward suction side, but are directed upward in the door 1 on the rear exhaust side. Further, openings formed in the rear side surface of the door 1 have a size equal to that of the fans 3. No openings other than those for the fans 3 are present.

Even in this embodiment, an ANC (active noise control) device set is incorporated in the hollow door 1. The ANC device in this embodiment comprises a noise sensor 11, a speaker 12, an analog type ANC controller 13. The ANC device is adapted to aim at suppressing sounds in the manner that the ANC controller 13 identifies signals having phases which are reverse to phases of sounds of noise sources picked up by the noise sensor 11, and issues these signals as correction sounds having the reverse phases obtained by reversing the phases of the noise sources by an angle of 180 deg., from the speaker 12.

The ANC device in this embodiment, no error sensor 10 is incorporated, and the ANC controller 13 is of an analog type as in a usual audio amplifier, and accordingly, the costs required for the ANC device can be greatly reduced, in comparison with the third embodiment shown in FIG. 6. However, the sounds and the phases of noise sources are merely shifted by 180 deg., and accordingly, the generation of a signal having an opposite phase is difficult for every frequency component. Thus, the effect of suppression of noises is itself inferior in comparison with the third embodiment shown in FIG. 6.

Even in this embodiment, of noises generated from the fans 3, those directed to the hollow door 1 are blocked and reflected by the bends 20 without directly going outside from the door 1, and are subjected to repetitions of inner surface reflection in the hollow space of the hollow door 1 before they go outside from the door 1. During the inner surface reflection, the noises from the fans 3 are greatly attenuated by the sound absorbing members 4 applied to the inner surface of the hollow door 1. Meanwhile, of the noises generated from the fans 3, those directed toward the housing 100 are repeatedly reflected between the doors 1 on the opposite sides within the housing 100, and accordingly, their energy is absorbed by the sound absorbing members 4 applied on the outsides of the doors 1 so as to suppress the sound thereof. Similarly, the noises from the disk drives 110 are repeatedly reflected between the doors 1 on the opposite sides within the housing 100 so as to suppress their sounds by the sound absorbing members 4 applied over the outside surfaces of the doors 1.

It is noted that a substantial sound suppressing effect may be obtained even only by the sound absorbing members 4 applied over the outside surfaces of the doors 1.

In general, the sound absorbing members 4 have their material property which can effectively attenuate high frequency components, but which can hardly remove components having low frequencies not higher than 500 Hz.

The ANC device in this embodiment, is adapted to aim at suppressing sounds with the use of reverse phase sounds against noises having frequencies not higher than 500 Hz, and accordingly, satisfactory noise suppression can be carried out in cooperation of the hollow doors 1.

Even in this embodiment which has the configuration that, as stated above, the bends 20 are directed downward in the door 1 on the forward suction side, but are directed upward in the door 1 on the rearward exhaust side, cooling air underneath the floor is likely to be sucked into the housing 100. Further, exhaust air smoothly flows toward the ceiling. Thus, it is possible to greatly lower the possibility of reintroduction of heat air into the disk array device from a space in the vicinity of the ceiling.

Even in this embodiment, the fans 3 are assembled in the door 1, vibrations are prevented from being propagated, direct to the disk drives 110, thereby it is possible to always satisfy the reading and writing in the disk drives 110.

As stated above, even in this embodiment, sounds from the fans 3 and the disk drives 110 which are main noise sources in the disk array device can be effectively prevented from leaking outside from the device, thereby it is possible to aim at effectively suppressing noises. Further, the possibility of reintroduction of heated air into the disk array device from a space in the vicinity of the ceiling can be greatly lowered, thereby it is possible to enhance the cooling efficiency.

Embodiment 5

Figure 8:
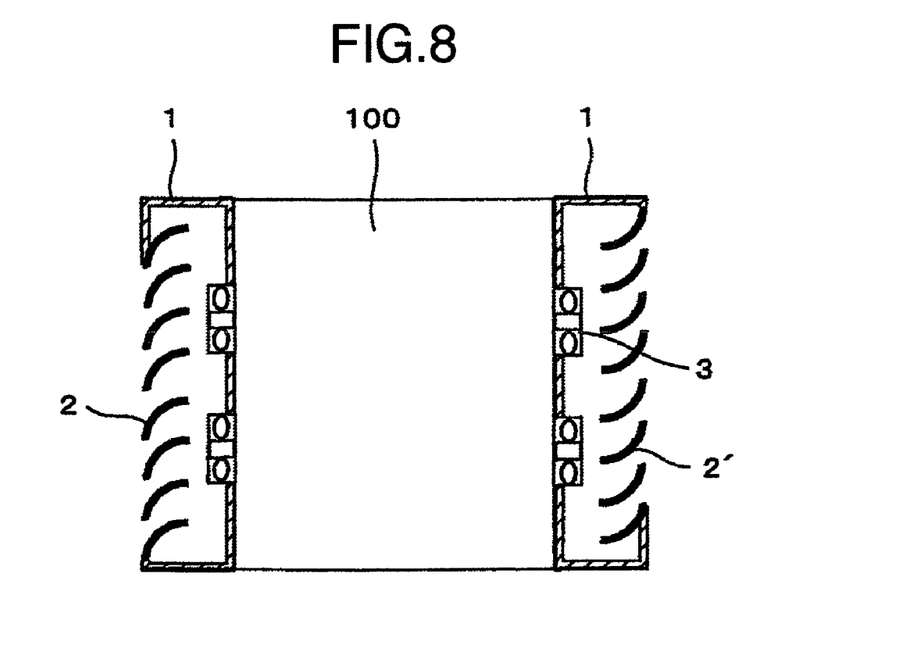
FIG. 8 is a sectional view illustrating the upper part of a disk array device in a fifth embodiment of the invention.
Figure 9:
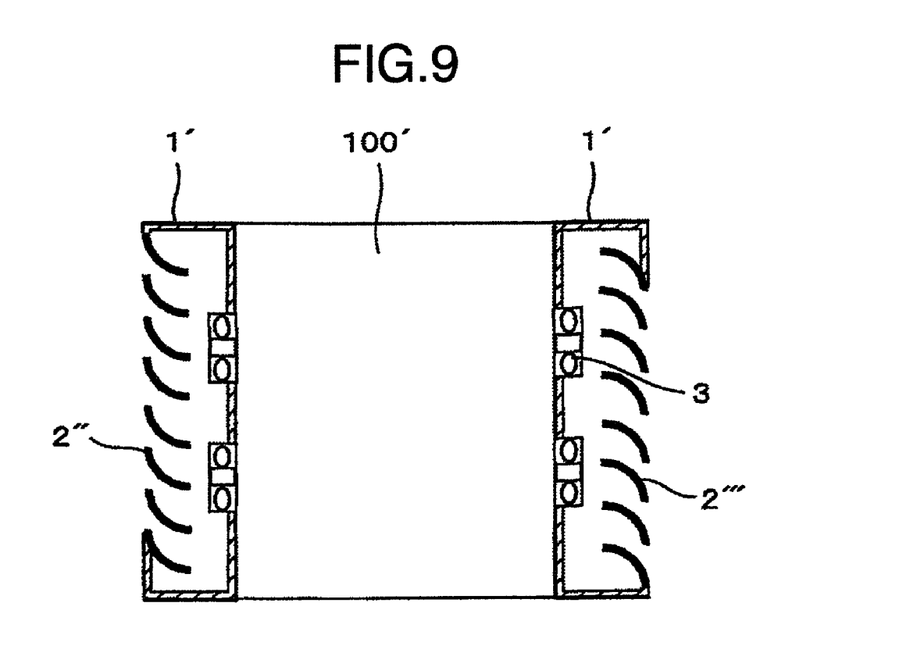
FIG. 9 is a sectional view illustrating the upper part of the disk array device in the fifth embodiment of the invention.
Figure 10:
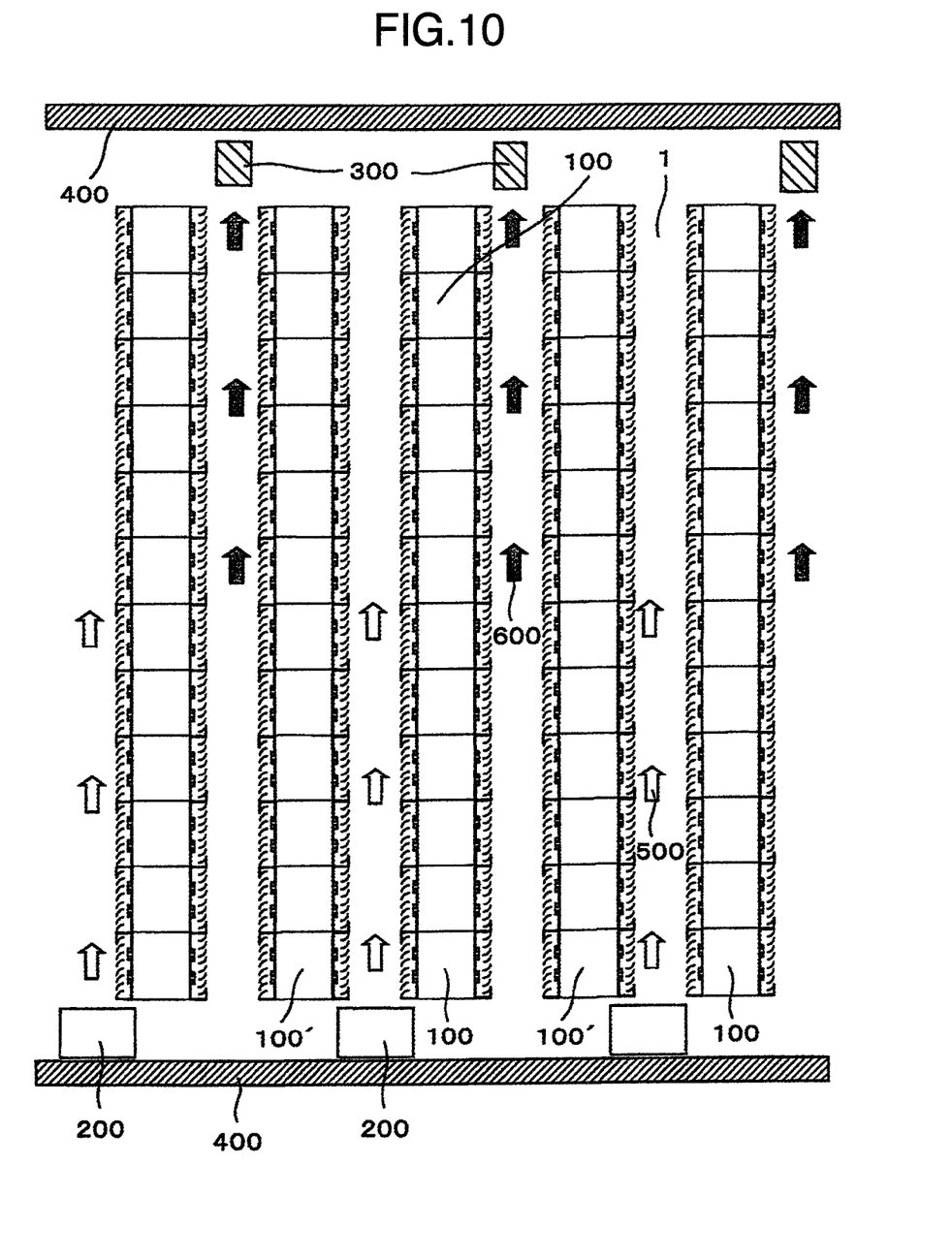
FIG. 10 is a view illustrating a data center in which the disk array device in the fifth embodiment of the invention is installed.

The fifth embodiment of the invention is shown in FIGS. 8 to 10.

FIGS. 8 and 9 are the cross-sectional views illustrating a top part of a disk array device in this embodiment, and FIG. 10 is the view showing a data center in which the disk array devices in this embodiment are installed.

Referring to FIGS. 8 to 10, even in this embodiment, a door 1 has therein a hollow space, and is provided with sound absorbing members 4 applied over the inner and outer surfaces thereof. The door 1 is formed with several louvers 2 in the front side thereof, and is mounted with several fans 3 in the rear side thereof. The louvers 2 provided in the front side of the door 1 are formed so that the inner surface of the hollow space is invisible, as views in front thereof, and are also provided with the sound absorbing members 4 applied over the inner and outer surfaces thereof. Further, openings formed in the rear side surface of the door 1 have a size equal to that of the fans 3, and no openings other than the openings for the fans 3 are present.

In this embodiment, the louvers 2 are directed in opposite directions, between the door 1 on the forward suction side and the door 2 on the rearward exhaust side. Further, their directions are set in two different manners as shown in FIGS. 8 and 9.

Even in this embodiment, of noises generated from the fans 3, those directed toward the door 1 are blocked and reflected by the louvers 2 without directly going out outside from the door 1, being subjected to repetitions of reflection between the doors 1 on opposite sides within the housing 100 before they goes out from the door 1, and accordingly, the energy of noises is absorbed by the sound absorbing members applied on the outsides of the doors 1 during the inner surface reflection so as to greatly suppress the sounds thereof.

Meanwhile, of noises from the fans 3, those directed toward the housing 100 are repeatedly reflected between the doors 1 on the opposite sides within the housing 100, and the energy of the noises is absorbed by the sound absorbing members 4 applied over the outside surfaces of the doors 1 so as to suppress the sounds thereof. Similarly, the noises from the disk drives 110 are subjected to repetitions of reflection between the doors 1 on both sides within the housing 100, and accordingly, the sounds thereof are suppressed by the sound absorbing members 4 applied on the outsides of the doors 1.

It is noted that a substantial sound absorbing effect can be obtained only by the sound absorbing members applied over the inner surface of the doors 1.

A data center in which disk array devices and electronic devices are arranged has a space surrounded by walls 400, and several housings 100 are laid in rows on the floors. Air-conditioners 200 are arranged at every other row along the one of the walls 400. Further, exhaust ports 300 are formed in the floor surface along the other one of the walls 400, also at every other row, being shifted from the rows at which the air-conditioners 200 are arranged. Heated air after cooling the housings 100 is sucked through the exhaust ports 300 and is returned into the air-conditioners 200 after flowing underneath the floor. The air cooled by the air-conditioner 200 and discharged from the outlet sides of the air-conditioners 100 flows through spaces between the rows on which the housings 100 are laid, and is finally discharged into the space above the floor.

In this embodiment, the louvers 2 are directed horizontally, and are directed in opposite directions between the door 1 on the forward suction side and the door 1 on the rearward exhaust side. These directions are set in two different manners as shown in FIGS. 8 and 9. The housings 100 installed in the data center in this embodiment are arranged so that the directions of the louvers 100 are the same at every row, but are different between the adjacent rows.

In this configuration, the cooling air discharged from the outlet side of the air-conditioners 200 into the space above the floor at a low temperature is sucked into the housings 100 while passing through the spaces between the rows on which the housings 100 are arranged. On this stage, the louvers 2 of the housings 100 on the suction side are directed toward the air-conditioners 200, and accordingly, the air can be smoothly introduced into the housings 100. The air heated after cooling the heating components in the housings 100, are exhausted from the rear surface sides of the housings 100.

As stated above, since the direction of the louvers 2 are set so as to be opposite to each other between the door 1 on the forward suction side and the door 1 on the rearward exhaust side, the exhaust air smoothly flows toward the exhaust ports 300. Thus, the possibility of reintroduction of the heated air into the disk array devices and the electronic devices from the exhaust side can be greatly lowered. Further, since the exhaust can be smoothly made, the necessity of additional blowers can be eliminated, thereby it is also possible to contribute to electric power saving in the data center.

Further, in this embodiment in which the fans 3 are all assembled in the doors 1, vibrations can be prevented from being directly propagated from the fans 3 to the disk drives 110, thereby it is possible to always satisfy the reading and writing in the disk drives 110.

Even in this embodiment, sounds from the fans 3 and the disk drives 110 which are main noise sources in the disk array device can be efficiently prevented from leaking outside from the disk array device, thereby it is possible to aim at suppressing sounds in the disk array device. Further, the possibility of reintroduction of heated air into the disk array device from the exhaust side can be greatly lowered, thereby it is possible to enhance the cooling efficiency.

As stated above, although explanation has been made of the various embodiments of the disk array devices, the gist of the invention can be also applied for an electronic device having a heating component such as a CPU.

In the case of a disk array device or an electronic device according to the invention, the cooling performance for a controller, a CPU and disk dives which are mounted in a housing can be enhanced, and accordingly, the processing speeds and the reliabilities of the controller and the CPU can be greatly enhanced while the temperature rise of the disk drives and unevenness in temperature among the disk drives can be reduced, thereby it is possible to aim at enhancing the reliability of the disk drives and at prolonging the service life thereof. Accordingly, it is possible to materialize the enhancement of the capacities and the processing speeds of the disk array device and the electronic device. Further, thereby it is possible to provide a disk arrays device and an electronic device with lower noises.

In the invention, it is possible to enhance the cooling efficiency for a controller or a CPU and disk drives mounted in a housing of a disk array device or an electronic device, thereby it is possible to aim at enhancing the reliability thereof and at prolonging the service life thereof. Thus, it is possible to materialize the enhancement of the capacities and the processing speeds of the devices. Further, it is possible to provide a disk array device and an electronic device with lower noise.

According to the invention, it is possible to enhance the cooling performance for a controller or a CPU and disk drives which are mounted in a housing of a disk array device or an electronic device, and accordingly, the processing speeds of the controller or the CPU can be greatly enhanced, and as well the temperature rise of the disk drives and unevenness in temperature among the disk drives can be reduced, thereby it is possible to aim at enhancing the reliability of the disk drives and at prolonging the service life thereof. Thus, it is possible to provide a disk array device and an electronic device which can materialize enhancement of the capacities and the processing speeds of the disk array device and the electronic device.

Further, the cooling performance for a controller or a CPU and disk drives, which are mounted in a hosing of a disk array device or an electronic device is enhanced so as to greatly enhance the processing speed and the reliability of the controller or CPU and to reduce a temperature rise of the disk drives and unevenness in temperature among disk drives so as to aim at enhancing the reliability of the disk drives and prolonging the service life the disk drives, thereby it is possible to materialize the enhancement of the capacity and the processing speed of the disk array device or the electronic device. Thereby, there can be provided a disk array device and an electronic device with lower noises.

It should be further understood by those skilled in the art that although the foregoing description has been made on the embodiments of the invention, the invention is not limited thereto and various changes and modifications may be made without departing from the spirit of the invention and the scope of the appended claims.

The invention claimed is:

1. A disk array device in which several disk drives are incorporated, or an array of heat-generating electronic devices, comprising:
    doors provided in a suction side and an exhaust side of the device, and
    louvers or bends provided in outside openings of the doors, the louvers or the bends being directed in directions which are opposite to each other between a door on the suction side and a door on the exhaust side,
    wherein the louvers or the bends provided in the outside openings of the doors are directed upward on the suction side and are directed downward on the exhaust side; where the doors in the suction side and the exhaust side of the device are hollow, each having openings in the outside and the inside thereof, and at least one of the doors having a plurality of fans mounted thereon.

2. The disk array device or the array of the heat-generating electronic devices according to claim 1, wherein the louvers or the bends provided in the outside openings of the doors, are directed horizontally.

3. The disk array device or the array of the heat-generating electronic devices according to claim 1, wherein the louvers or the bends provided in the outside openings of the doors, are directed in the same direction as every one of a plurality of rows on which housings are arranged in a space within a building such as a data center, but are directed in the different direction between adjacent rows thereof.

4. The disk array device or the array of heat-generating electronic devices according to claim 1, wherein the inside openings of the doors are the same size as that of the fans.

5. The disk array device or the array of heat-generating electronic devices according to claim 1, wherein each of the hollow doors provided on its inner surface alone or on its both inner and outer surfaces with sound absorbing members.

6. The disk array device or the array of the heat-generating electronic devices according to claim 1, wherein each of the hollow doors provided with an active noise control device.

7. The disk device or the array of the heat-generating electronic devices according to claim 1, wherein the louvers or bends provided in the outside openings of the doors are formed in the manner that the inner surfaces of the hollow inside space of the doors are invisible when viewed from the front thereof.

8. A disk array device in which several disk drives are incorporated, comprising:
   doors provided in a suction side and an exhaust side of the device, and
   louvers or bends provided in outside openings of the doors, the louvers or the bends being directed in directions which are opposite to each other between a door on the suction side and a door on the exhaust side,
   wherein the louvers or the bends provided in the outside openings of the doors are directed upward on the suction side and are directed downward on the exhaust side; wherein the doors in the suction side and the exhaust side of the device are hollow, each having openings in the outside and the inside thereof, and at least one of the doors having a plurality of fans mounted thereon.

9. The disk array device according to claim 8, wherein the louvers or the bends provided in the outside openings of the doors are directed horizontally.

10. A heat-generating electronic device, comprising:
    doors provided in a suction side and an exhaust side of the device, and
    louvers or bends provided in outside openings of the doors, the louvers or the bends being directed in directions which are opposite to each other between a door on the suction side and a door on the exhaust side,
    wherein the louvers or the bends provided in the outside openings of the doors are directed upward on the suction side and are directed downward on the exhaust side; wherein the doors in the suction side and the exhaust side of the device are hollow, each having openings in the outside and the inside thereof, and at least one of the doors having a plurality of fans mounted thereon.

11. The heat-generating electronic device according to claim 10, wherein the louvers or the bends provided in the outside openings of the doors are directed horizontally.

* * * * *